United States Patent [19]

Elliott et al.

[11] Patent Number: 4,801,152

[45] Date of Patent: Jan. 31, 1989

[54] BOAT DOLLY

[76] Inventors: James H. Elliott, 9701 Muirfield Dr., Upper Marlboro, Md. 20772; Robert Bagley, 13202 Midway Ave., Rockville, Md. 20851

[21] Appl. No.: 71,875

[22] Filed: Jul. 10, 1987

[51] Int. Cl.[4] ............................................. B62B 3/02
[52] U.S. Cl. ................................... 280/47.34; 280/35; 280/79.1 A; 280/414.1; 114/344
[58] Field of Search ........... 280/414.1, 414.2, 47.13 B, 280/47.34, 79.1 A, 35, 47.14, 656; 114/344

[56] References Cited

U.S. PATENT DOCUMENTS

| 2,472,952 | 6/1949 | Lennard | 280/79.1 A |
| 3,379,314 | 4/1968 | Corning | 280/414.1 |
| 3,379,452 | 4/1968 | Torrisi | 280/414.1 |
| 4,327,933 | 5/1982 | Tuggle | 280/414.2 |
| 4,507,016 | 3/1985 | Honour, VII | 280/414.1 X |

FOREIGN PATENT DOCUMENTS

| 1001323 | 8/1965 | United Kingdom | 280/414.2 |
| 1150841 | 5/1969 | United Kingdom | 280/79.1 R |

Primary Examiner—David M. Mitchell
Assistant Examiner—Brian L. Johnson
Attorney, Agent, or Firm—Eric P. Schellin

[57] ABSTRACT

A boat dolly having two narrow upstanding carriages held in spaced apart relationship by elongated rods. Each carriage has a V-shaped notched into which a boat is fitted and is carried therein. Each carriage is fitted with rotatable subassembly carriages. Each subassembly carriage is fitted at their underside thereof with at least three caster wheels. The casters rotate 360° and the subassemblies also rotate 360°. As a result the entire dolly is able to rotate 360° about a central vertical axis.

3 Claims, 2 Drawing Sheets

BOAT DOLLY

BACKGROUND OF THE INVENTION

The concept of boat trailers is well known. A boat trailer usually consists of an elongated metal frame with one or more sets of wheels positioned near approximately one end. The other end terminates in a tongue for mounting to a hitch of a powered vehicle. Sometimes the boat trailer by means of its tongue is mounted onto a hitch ball which is mounted on a manually operated small wheeled hand truck. If the boat and trailer is light enough the boat on the trailer may be annually pushed around into position. However if a 360° circle is attempted it will be noted that the axis of rotation is vertical through the axle of the wheels of the boat trailer or between the two axles of the boat trailer when the boat trailer has tandem axles. In either event the boat trailer is not as maneuverable as one would wish, especially in small marine yards; plus a large portion of the trailer at the tongue must extend beyond the boat.

A good boat dolly should have a number of attributes. It should be extremely stable. It should not require picking up of a heavy tongue. It should be very maneuverable, preferably turning 360° on itself. It should be easy to transfer a boat from a conventional boat trailer to the boat dolly and vice versa. It should be relatively inexpensive of construction. It should accommodate various sizes of boats.

SUMMARY OF THE INVENTION

The present invention encompasses two or more narrow elongate carriages. Each of the carriages have at least two sub-assembly carriages rotatably mounted thereinunder at approximately the ends thereof. Each of the sub-assembly carriages have a triangular horizontal plate. Each of these plates have mounted thereinunder three large caster wheels. In effect each caster can rotate 360° and each entire sub-assembly can rotate 360°. The feature of the sub-assembly carriage insures great maneuverability to the boat dolly. Each of the carriages has an upwardly facing V-shape notch, adapted and constructed to support a boat when the carriage is positioned normal to the long axis of the boat. Desirably, one carriage is positioned near the stern of the boat and the other carriage is located near the bow. While the carriage and its sub-assemblies are of sufficient lateral width to be self standing, stability is enhanced by employing one or more stabilizer bars or rods. These rods are mounted through holes in the parallely facing carriages. Appropriate adjustable rings are located and locked on both sides of a carriage, i.e., secured in a sandwich manner whereby the carriages are thusly unitary as a structure.

The boat is retained in position by a strap at each carriage so that the boat is suitably embraced by a strap that extends from one side of a carriage to the other side of the carriage. Take-up means is supplied whereby the strap is suitably tightened.

As the stabilizer rods are adjustable it will be seen that the distance between the carriages may be varied considerably to accommodate various lengths of boats.

At the same time the V-shaped notch of the carriage may be also varied to accommodate what is known as deep vee boats or shallow boats by the addition of a V-shaped filler.

It is also contemplated that a removable elongated handle may be affixed to the lower center position of one of the forward facing carriages whereby the boat dolly carrying its boat may be pushed or pulled into a desirable position.

DETAILED DESCRIPTION OF THE INVENTION

Figure 1:
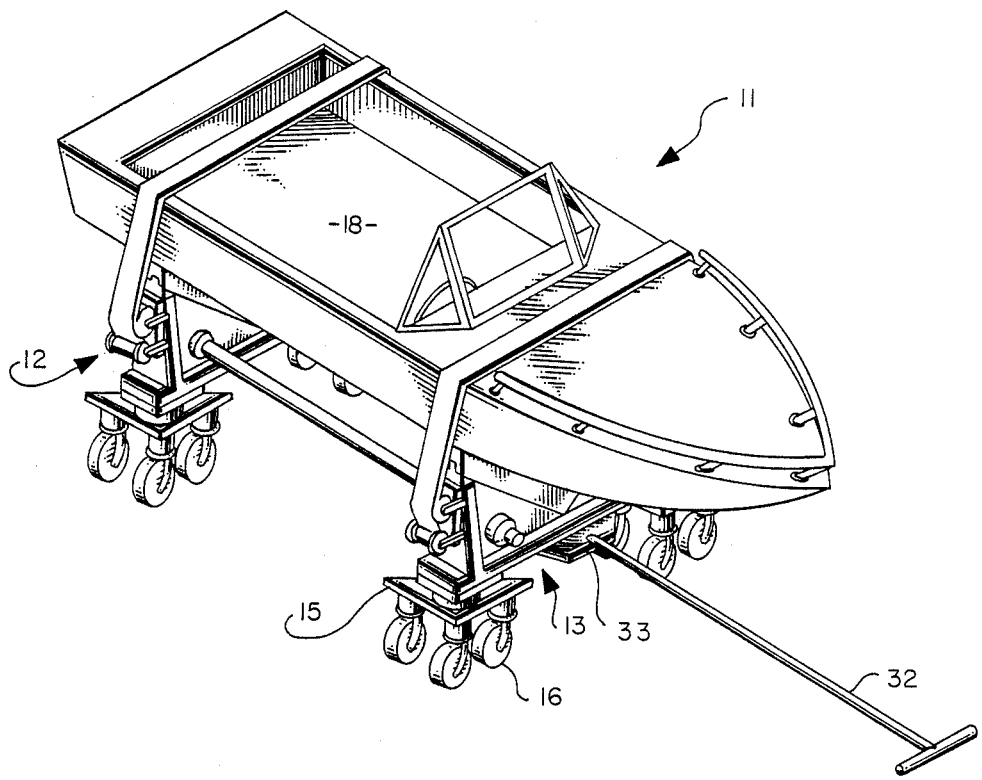
FIG. 1 is a perspective view of the device of the present invention with a boat mounted thereon.

It is pointed out that the device of the present invention shown, generally by reference numeral 11, comprises primarily of two spaced first carriage 12 and second carriage 13 The carriages 12 and 13 have base portions 14 at both sides of the base portion 14 there is mounted rotatably therebeneath a equilateral triangular plate 15. At each triangular corner thereof there is a depending rotatable caster 16. The plate- 15 and the casters 16 describe sub-assemblies 10.

Each of the carriage 12 and 13 has an upstanding wall portion 17. The said upstanding wall portions 17 terminate in a V-shaped portion 19 adapted and constructed to accept a filler 20 and a boat 18 for carrying purposes shown by FIG. 1.

The sides 29 of the carriages are fitted with a ratchet furled strap 21 that is used to lock the boat into a secure position.

A second carriage 13 is also used to carry the boat. The second carriage is in spaced parallel relationship to the first carriage 12 and is fabricated in the same manner and has the same structural details.

Figure 3:
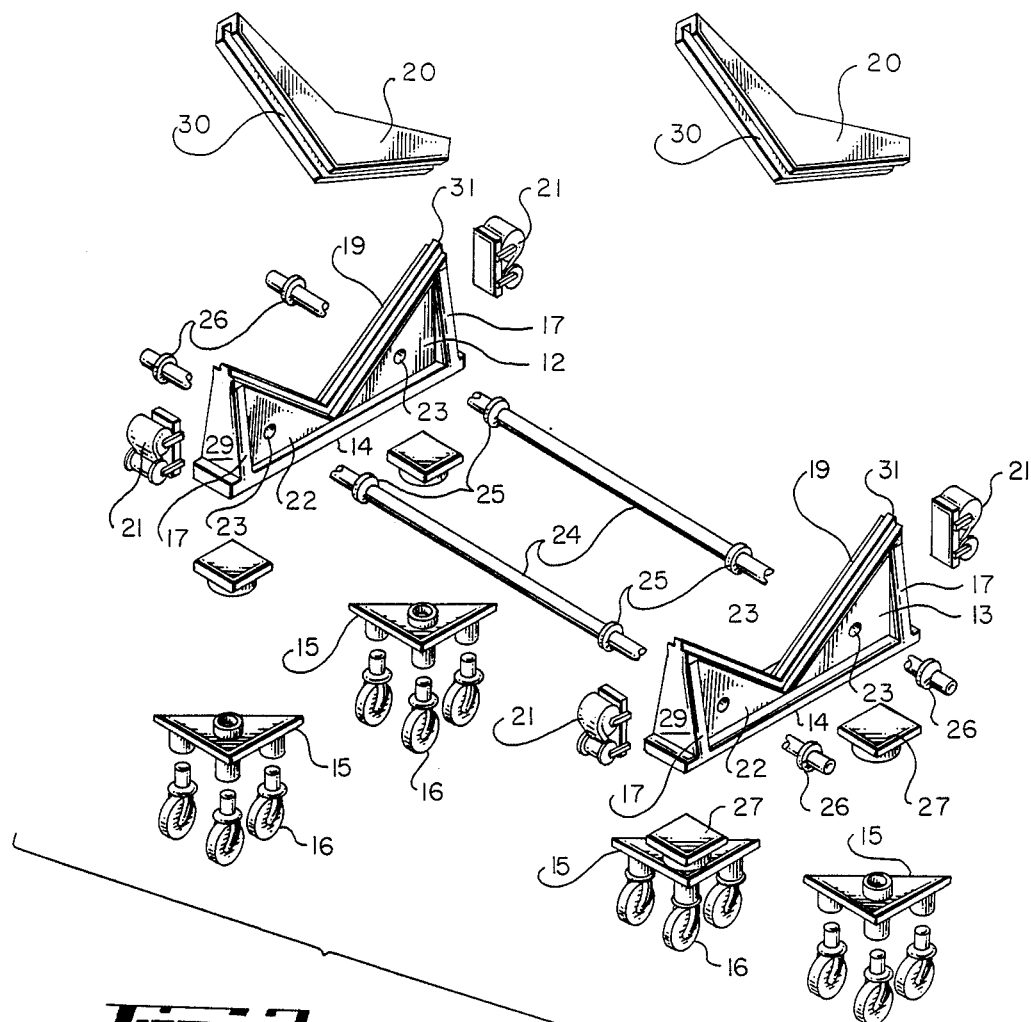
FIG. 3 is an exploded view of the dolly of the present invention.
Figure 2:
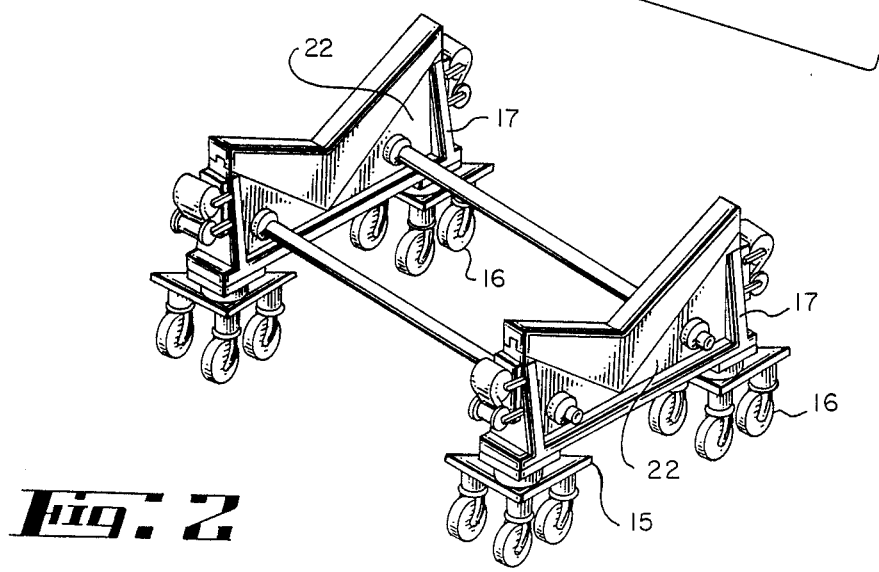
FIG. 2 is a perspective without a boat placed thereon.

As can be seen especially from FIG. 3 each of the upstanding portion 17 of the carriages has a web portion 22. The web portion 22 has two holes 23 near the bottom thereof and essentially equidistant from an imaginary center line. The holes 23 are fitted with a pair of elongated rods 24 that have fixably movable first ring flanges 25 on one side of the web 22 therein fixed by set screws. The rods are designed to fit through the holes 23 whereby a portion thrusts beyond the web 22 outwardly. A second movable ring flange 26 is fastened to the other side of the web 22 by set screws thereby preventing the rods from slipping from their respective positions.

The subassemblies 10 comprise the plate 15, the casters 16 and a plate 27 which is bolted on the underside of the base portion 14 of each of the carriages.

The V-shaped element 20 may have different configurations and is affixed to the upwardly facing V-shaped notch portions 19 of the carriages. The V-shaped filler element 20 has a groove 30 along the bottom thereof which mates with an upstanding edge 31 on the surface of the V-shaped notches 19. The V-shaped element is suitably affixed to the carriages as by screw, bolts and the like.

Figure 4:
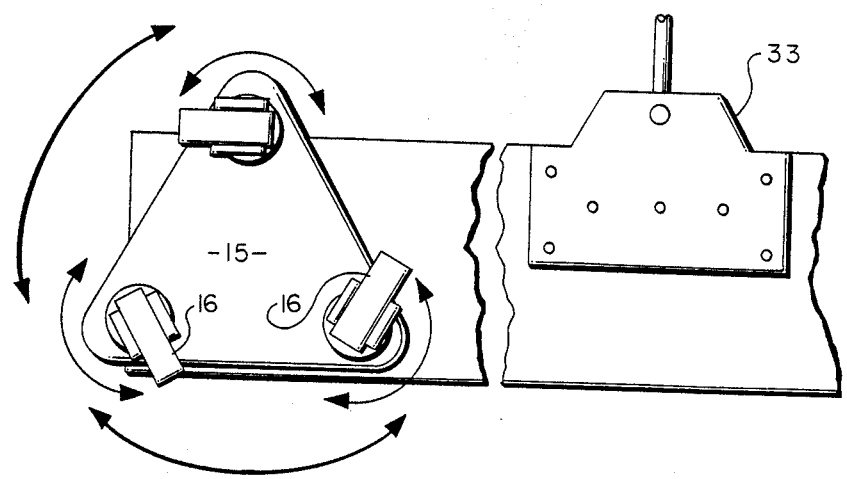
FIG. 4 is a fragmentary bottom view to show the caster arrangement in detail.

In FIG. 1 it will be seen that an elongated handle 32 may be arcuately movably affixed to the central portion of carriage 13 through the aegis of a plate 33 shown in the Figure but more distinctly in FIG. 4. The latter Figure shows the underside of a portion of a carriage and the underside of one sub-assembly. Note therefrom that the plate 15 rotates 360° and each of the casters 16 rotate 360°.

In use the boat dolly of the present invention can be used to transfer a boat from a conventional boat trailer to it with ease. One of the carriages is positioned beneath the boat while on its trailer. The carriage is placed rearward under the boat that normally extends rearwardly beyond the trailer but before the stern which usually carries a motor. The rear portion of the boat is deposited onto the first carriage by arcuately moving the rear of the boat up or down by raising or lowering the tongue of the trailer. When it has been ascertained that the carriage has accepted weight on the carriage the holding strap is unfurled from the ratchet wind-up mechanism on one side of the carriage and is passed over the boat to the other side of the carriage to which it is taken up and made taunt. The first carriage is now moved rearwardly of the trailer which is suitably braked to retain its position. As the first carriage is moved the boat is gradually slid off its trailer. The boat now bridges the space from the carriage to the trailer, at which point a second carriage is placed under the boat under a considerably more forward position. Again the tongue of the trailer is raised or lowered to permit positioning of the boat on the second carriage in its V-shaped notch thereof. Again the strap of the second carriage is unfurled from one side of the carriage and placed over the boat and is secured to the other side of the carriage and tightened.

Each of the two carriages is possessed of two holes which are now in alignment when the boat is in position as just noted. The stabilizer rods are passed through two of the first set of holes and a second stabilizer is passed through the second set as shown in the Figures. The rods are affixed into position by ring flanges that are affixed to the respective rods by set screws in each ring flange whereby a portion of the carriage is sandwiched therebetween and the rods are thereby securely affixed but are adjustable depending on the spacing between the carriage which in turn is dependent in the length of the boat.

In demounting of the boat from the boat dolly into a trailer, for instance, the procedure is reversed. A conventional boat trailer is brought up and positioned beneath the bow of the boat and by adjusting the height of the tongue of the trailer, the end of the trailer takes, up the weight of the forward end of the boat. The stabilizer rods are removed. The second carriage is moved in the direction towards the tongue of the trailer and the boat is winched up onto the trailer as usual. Then the first carriage may be removed when the boat is completely on the trailer in its conventional position.

The boat dolly may be constructed of steel tubing or of wood or of any sufficiently rigid material that is of sufficient strength.

Various modifications can be made to the present invention without departing from the apparent scope thereof. The system is intended for pleasure watercraft as well as commercial watercraft. The length or width of the vessel is the determining size of the structure of each of the components. The device is intended for fresh water as well as salt water situations.

What is claimed is:

1. A boat dolly comprising at least two narrow elongated upper carriages, said upper carriages each having a base portion each with an underside, at least two subassembly carriages mounted to rotate 360° at the underside of said upper carriages in spaced apart relationship, each of said subassembly carriages having at least three ground rolling contact caster wheels mounted to a plate that rotates 360°, each of said upper carriages having a V-shaped notched means for supporting a portion of the underside of a boat, said upper carriages being in spaced apart relationship, mounted means comprising two laterally spaced elongated rigid rods for connecting said upper carriages in a spaced apart relationship, said elongated rigid rods including adjustable ring flange means and said upper carriage mounting means including holes through which a portion of said rods extend such that said upper carriages are sandwiched between said adjustable ring flange means.

2. The boat dolly of claim 1 wherein the V-shaped notched means for supporting a portion of the underside of a boat has a V-shaped insert.

3. The boat dolly of claim 1 wherein each of the carriages is provided with tie down means whereby a boat may be secured to the dolly.

* * * * *